United States Patent
Niederhauser et al.

(10) Patent No.: US 10,423,172 B2
(45) Date of Patent: Sep. 24, 2019

(54) DEVICE FOR MEASURING AND REGULATING A VOLUME FLOW IN A VENTILATION PIPE

(75) Inventors: Urs Niederhauser, Pfungen (CH); Frank Lehnert, Rüti ZH (CH); Egli Egli, Grüningen (CH); Phillip Holoch, Neschwil (CH)

(73) Assignee: BELIMO HOLDING AG, Hinwil (CH)

( * ) Notice: Subject to any disclaimer, the term of this patent is extended or adjusted under 35 U.S.C. 154(b) by 101 days.

(21) Appl. No.: 12/921,207

(22) PCT Filed: Feb. 19, 2009

(86) PCT No.: PCT/CH2009/000068
§ 371 (c)(1),
(2), (4) Date: Dec. 9, 2010

(87) PCT Pub. No.: WO2009/109056
PCT Pub. Date: Sep. 11, 2009

(65) Prior Publication Data
US 2011/0105012 A1    May 5, 2011

(30) Foreign Application Priority Data
Mar. 7, 2008  (CH) .......................... 334/08

(51) Int. Cl.
*F24F 11/74*    (2018.01)
*G05D 7/06*    (2006.01)
(Continued)

(52) U.S. Cl.
CPC ............ *G05D 7/0635* (2013.01); *F24F 11/74* (2018.01); *G01F 1/6842* (2013.01); *F24F 2110/30* (2018.01)

(58) Field of Classification Search
CPC ... F24F 11/04; F24F 2011/0093; G01F 1/684; G01F 1/6842; G01P 5/12; G05D 7/0635
(Continued)

(56) References Cited

U.S. PATENT DOCUMENTS 3,464,269 A * 9/1969 Froger ........................ 73/204.22
3,587,312 A * 6/1971 McMurtrie ........... G01F 1/3272
73/861.22
(Continued)

FOREIGN PATENT DOCUMENTS

DE    4424652 A1    1/1995
DE    4424652 A1 *  1/1996 ............... G05D 7/06
(Continued)

OTHER PUBLICATIONS

NMV-D2M-1 Product Information, Air Volume Control. Datasheet [online]. Belimo Holding AG, (Switzerland, 2002), Retrieved on Mar. 9, 2013). Retrieved from the Internet. <www.belimo.ch/pdf/e/nmvd2m/e>.*

(Continued)

*Primary Examiner* — Kenneth Rinehart
*Assistant Examiner* — Phillip Decker
(74) *Attorney, Agent, or Firm* — Birch, Stewart, Kolasch & Birch, LLP

(57) ABSTRACT

A device for measuring a volume flow in a ventilation pipe (1) comprises a sensor element (13) disposed on the mounting (8) and configured as a thermal anemometer. Upstream of the sensor element is a turbulence-generating element, which is configured and disposed at a distance from the sensor surface (18.1) such that highly turbulent flow is generated in the region of the sensor surface in a targeted manner. Downstream of the sensor surface is a flow element (20), which widens in the cross-section thereof in the flow direction (L), wherein starting from a height level of the (Continued)

sensor surface a height is reached that is greater than the height of the break-away edge (17.1) opposite the sensor surface.

8 Claims, 2 Drawing Sheets

(51) Int. Cl.
*G01F 1/684* (2006.01)
*F24F 110/30* (2018.01)

(58) Field of Classification Search
USPC ........ 454/239, 266, 290, 327, 355; 133/556; 702/45
See application file for complete search history.

(56) References Cited

U.S. PATENT DOCUMENTS

| | | | | |
|---|---|---|---|---|
| 3,719,073 | A * | 3/1973 | Mahon | G01F 1/32 73/861.22 |
| 3,888,120 | A * | 6/1975 | Burgess | G01F 1/3263 73/861.24 |
| 4,116,060 | A * | 9/1978 | Frederick | G01F 1/3209 73/861.22 |
| 4,375,667 | A * | 3/1983 | Buchan | 73/861 |
| 4,428,231 | A * | 1/1984 | Peloza | 73/202.5 |
| 4,448,081 | A * | 5/1984 | Kolitsch | G01F 1/28 73/861.03 |
| 4,457,169 | A * | 7/1984 | Lauterbach et al. | 73/202.5 |
| 4,472,239 | A * | 9/1984 | Johnson et al. | 438/49 |
| 4,581,930 | A * | 4/1986 | Komons | 73/204.17 |
| 4,742,574 | A * | 5/1988 | Smith | G08C 19/02 250/214 A |
| 4,779,458 | A * | 10/1988 | Mawardi | 374/41 |
| 4,966,037 | A * | 10/1990 | Sumner et al. | 73/204.26 |
| 5,000,039 | A * | 3/1991 | Wright | G01F 1/72 73/114.32 |
| 5,152,181 | A * | 10/1992 | Lew | G01F 1/3218 73/861.02 |
| 5,485,746 | A * | 1/1996 | Mori | F02D 41/187 73/114.34 |
| 5,741,180 | A * | 4/1998 | Xia et al. | 454/327 |
| 5,877,416 | A * | 3/1999 | Kapartis | 73/170.13 |
| 5,880,377 | A * | 3/1999 | Celik | G01F 1/3218 73/861.22 |
| 6,101,429 | A * | 8/2000 | Sarma et al. | 701/7 |
| 6,105,927 | A * | 8/2000 | Zelczer et al. | 251/58 |
| 6,327,918 | B1 * | 12/2001 | Lawless | 73/863.21 |
| 6,463,397 | B1 * | 10/2002 | Cohen et al. | 702/140 |
| 6,571,623 | B1 * | 6/2003 | Blasczyk et al. | 73/204.22 |
| 6,619,114 | B1 * | 9/2003 | Lenzing | G01F 1/6842 73/202.5 |
| 6,840,116 | B2 * | 1/2005 | Higgins | 73/861.85 |
| 7,007,556 | B2 * | 3/2006 | Keita | G01F 1/3209 73/861.22 |
| 7,044,001 | B2 * | 5/2006 | Sylvia | G01F 1/662 73/861.29 |
| 7,047,822 | B2 * | 5/2006 | Good | G01F 1/40 73/861.52 |
| 7,177,770 | B1 * | 2/2007 | Hocken et al. | 702/45 |
| 7,178,410 | B2 * | 2/2007 | Fraden et al. | 73/861.52 |
| 7,212,928 | B2 * | 5/2007 | Cook | G01F 1/3254 702/45 |
| 7,228,750 | B2 * | 6/2007 | Brandt, Jr. | 73/861.63 |
| 7,258,024 | B2 * | 8/2007 | Dimarco | G01F 1/3209 73/861.22 |
| 7,305,877 | B2 * | 12/2007 | Beyrich et al. | 73/202.5 |
| 7,321,833 | B2 * | 1/2008 | DuHack et al. | 702/47 |
| 7,500,392 | B1 * | 3/2009 | Plowman et al. | 73/204.26 |
| 7,523,659 | B2 * | 4/2009 | Okamoto | G01F 1/6842 73/202.5 |
| 7,681,461 | B2 * | 3/2010 | Rosenbaum | F02D 41/18 73/861.52 |
| 7,903,414 | B2 * | 3/2011 | Nishiyashiki et al. | 361/709 |
| 7,931,525 | B2 * | 4/2011 | Lehnert | 454/290 |
| 8,234,931 | B2 * | 8/2012 | Cheng | G01F 1/3218 73/861.22 |
| 8,430,731 | B2 * | 4/2013 | Bamberger | 454/266 |
| 8,448,503 | B2 * | 5/2013 | Opitz | G01F 1/6842 73/114.34 |
| 2005/0109102 | A1 * | 5/2005 | Liu et al. | 73/204.27 |
| 2005/0223828 | A1 * | 10/2005 | Olin | 73/866.5 |
| 2007/0021049 | A1 * | 1/2007 | Bender | 454/141 |
| 2007/0099556 | A1 * | 5/2007 | Lehnert | 454/239 |
| 2007/0256493 | A1 * | 11/2007 | Okamoto | G01F 1/6842 73/204.11 |
| 2008/0087102 | A1 * | 4/2008 | Snell et al. | 73/861.85 |
| 2009/0000366 | A1 * | 1/2009 | Uramachi | 73/114.32 |
| 2010/0105312 | A1 * | 4/2010 | Bamberger | 454/266 |
| 2010/0154532 | A1 * | 6/2010 | Becke et al. | 73/170.12 |

FOREIGN PATENT DOCUMENTS

| | | | | |
|---|---|---|---|---|
| DE | 10 2005 038 598 A1 | 2/2007 | | |
| DE | 10 2007 017 682 A1 | 10/2007 | | |
| EP | 339 626 B1 | 7/1992 | | |
| EP | 0578029 A1 * | 1/1994 | | G01F 1/6842 |
| EP | 578 029 B1 | 12/1994 | | |
| EP | 1614975 A | 11/2006 | | |
| JP | 2003050029 A * | 2/2003 | | |
| WO | 2005053975 A | 6/2005 | | |
| WO | WO 2007020116 A1 * | 2/2007 | | G01F 1/6842 |
| WO | WO 2008/019519 * | 2/2008 | | F24F 13/14 |

OTHER PUBLICATIONS

NMV-D2M-0 Technical Data (Overview), Air vol. Control. Datasheet [online]. Belimo Holding AG, (USA, 2001), (Retrieved on Mar. 9, 2013). Retrieved from the Internet. <www.belimo.com/pdf/e/vav/compact/e>.*
Bamberger, WO 2008/019519 A1 English machine translation, Feb. 21, 2008.*
Lehnert, WO 2005/053975 A1 English machine translation, Jun. 16, 2005.*
Hecht, et al, WO 2007/020116 A1 English machine translation, Feb. 22, 2007.*
Chinese counterpart office action and translation.

* cited by examiner

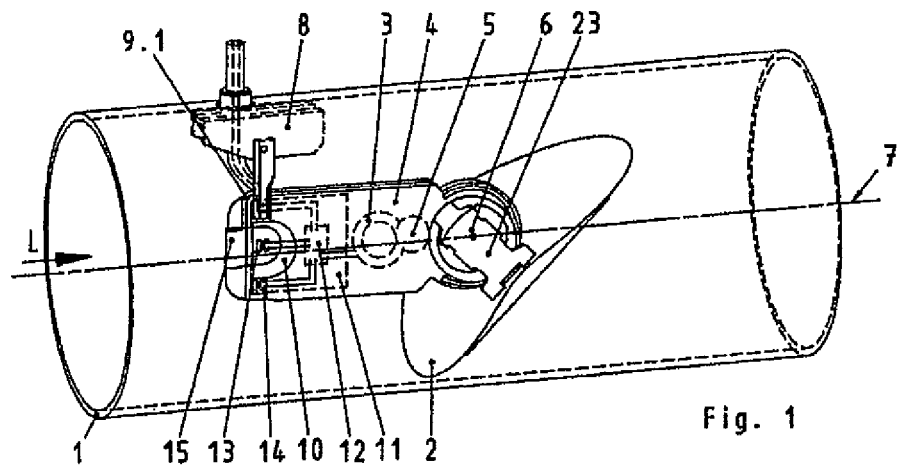
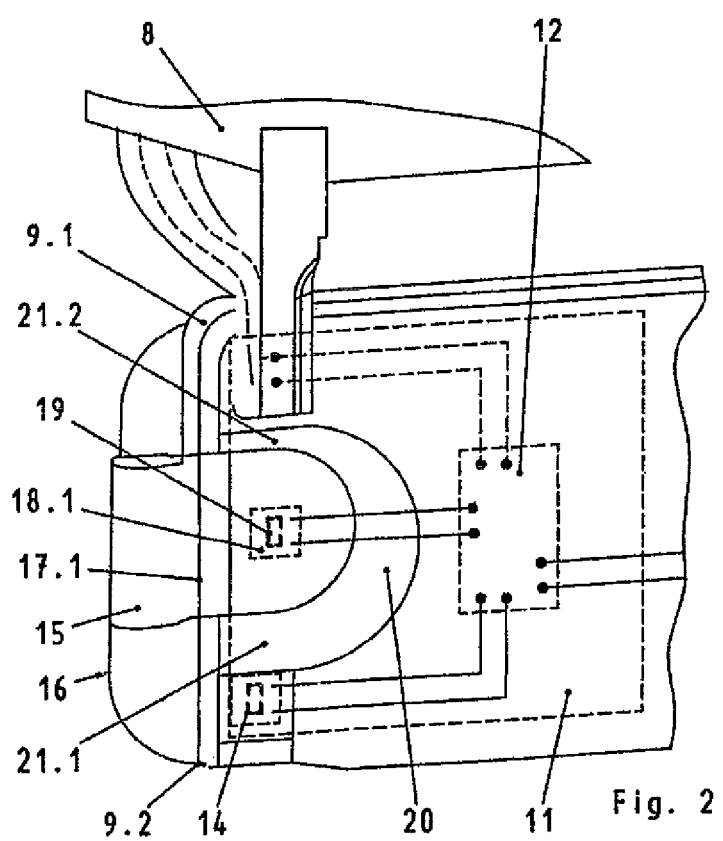

DEVICE FOR MEASURING AND REGULATING A VOLUME FLOW IN A VENTILATION PIPE

TECHNICAL FIELD

The invention relates to a device for measuring and regulating a volume flow in a ventilation pipe, comprising a ventilation flap mountable in the ventilation pipe, a drive for actuating the ventilation flap, in order thereby to regulate the volume flow, and at least one sensor element, capable of being placed in the ventilation pipe by means of a mounting, for measuring the volume flow.

PRIOR ART

To regulate the ventilation of rooms, it is necessary to measure the incoming-air and outgoing-air flow. There are, for example, rod-shaped probes which can be mounted inside the pipe and position the sensor approximately at the center of the pipe cross section, that is to say at the location of the highest flow velocity. However, these have to be mounted in addition to the ventilation flaps and drives, thus increasing the outlay in terms of the installation of the ventilation system as a whole.

A device for regulating an air stream in a ventilation pipe is known from WO 2005/053975 (Belimo). Two pressure measurement cells are integrated on the mounting, arranged in the ventilation pipe, of the air flap, in such a way that the volume flow can be determined via differential pressure. The measurement cells are, for example, arranged in each case on the end faces at the diametrically opposite ends of the pivotable mounting, the mounting standing obliquely to the longitudinal axis of the ventilation pipe and extending virtually from one wall to the other.

Determining the volume flow via pressure measurement cells has some disadvantages. It is known that thermal anemometers (that is to say, anemometers based on temperature measurement, to be precise on the determination of the degree of cooling of a heating element which is dependent on the flow velocity of the medium) have a greater measurement range. In particular, even relatively low flow velocities can be measured. Finally, the sensor is accurate and compact.

The use of thermal anemometers is known per se for various applications. In DE 10 2007 017 682 A1 (ebmpabst) such a sensor is arranged directly downstream of a fan, in order to determine the volume flow of the fan and regulate the rotational speed of the fan.

EP 0 339 626 describes an independent measuring probe which is based on a thermal anemometer and which is insensitive to orientation adjustment errors and responds quickly to flow changes. A cylindrically symmetrical onflow cap is provided on each of the two sides of the sensor on the bar probe aligned perpendicularly to the direction of flow, so that, together with the tapered sensor portion, a dumbbell-shaped configuration is formed. The onflow caps are, for example, conical or in the form of a spherical cap, the planar base of the cone or of the spherical cap pointing toward the sensor portion, and an abrupt change in cross section being obtained. What is achieved by means of the mirror-symmetrical onflow caps is that the cylindrical symmetry is broken in terms of the flow conditions in favor of a quasi-spherical flow direction characteristic. The dumbbell-shaped design is intended to achieve an independence of direction of the sensor over a wide onflow angle range.

A hot-film air mass meter is known from DE 10 2005 038 598 (Robert Bosch GmbH), which can be used in the intake track to an internal combustion engine (with flow velocities of 0-60 m/s). To avoid surface contamination and associated signal drift, a flow separation element is provided. This has the effect that the oil particles are deposited, in flow terms, in a "dead water zone" directly downstream of the flow separation element. The separation edge should be elevated by at least 15-40 µm with respect to the plane of the sensor chip and should precede the sensor region by at least 30-60 µm and at most 200-600 µm. (The area of the sensor amounts, for example, to 1600 µm×500 µm).

A sensor system for monitoring and detecting the flow direction of an outgoing-air stream is known from EP 0 578.029 B1 (Trox). Two electrically heated thermally sensitive resistors are arranged one behind the other in the flow direction. A barrier element ensures that the thermally sensitive resistor element in each case lying downstream is in the lee of the flow and is therefore not cooled. A differential temperature is thus determined, which makes it possible to infer the flow direction.

With the use of conventional volume flow sensors in the ventilation pipes, it was shown that the sensor signals are influenced by the geometry of the line profile. The result of this is that the question of whether the sensor is mounted directly downstream of a curved pipe piece or downstream of a straight pipe piece has to be addressed. The installation of volume flow sensors in a controlled system is thereby made difficult and leads to an increased outlay in terms of planning installation. If these influences are not taken into account when the sensor is being installed, measuring errors occur.

PRESENTATION OF THE INVENTION

The object of the invention is to specify a device belonging to the technical field initially mentioned which can reliably measure and regulate the volume flow in dependence on the geometry of the line pipe. In particular, an arrangement is to be provided which can be implemented integrally and cost-effectively with the drive and the regulation of a ventilation flap.

The object is achieved in that the sensor element provided is a thermal anemometer with a sensor surface for measuring the volume flow.

By a motor-controllable ventilation flap and a thermal anemometer being combined, it becomes possible to achieve a reliable regulation of the volume flow cost-effectively. Measurement by means of a thermal anemometer proves to be simpler and more reliable than the pressure difference measurement previously known with regard to ventilation flaps. The mounting, to which the sensor element is connected directly or indirectly, makes it possible for the sensor surface to be placed at a desired location (preferably, on the longitudinal mid-axis of the ventilation pipe).

According to a preferred embodiment, the thermal anemometer, in particular the sensor surface, is arranged on a housing of the drive or is integrated in the housing (to be precise, in its outer wall). The device can therefore be designed as a structural unit which can be mounted as a whole completely within the ventilation pipe. There is therefore no need for separate sensors to be mounted. It is also possible, however, to design the sensor as a separate module, if appropriate with integrated regulating electronics for volume flow regulation by means of the ventilation flap.

In the preferred embodiment mentioned, the housing is attached to the mounting, which is designed in such a way that the sensor element is placed essentially in the center of the ventilation pipe. The mounting may be adjustable or exchangeable, so that the housing can be mounted correctly, that is to say with the sensor element at the center of the ventilation pipe, in ventilation pipes of various sizes. Thus, for example, a specific mounting can be provided for any conventional cross-sectional size of the ventilation pipe. The fitter then only needs to fit the mounting intended for the respective pipe cross section, in order to ensure that the sensor element is at the optimal location in measurement terms.

An electronic control integrated in the structural unit ensures that the volume flow can be regulated according to a stipulated desired value by means of the ventilation flap. The desired value is stipulated from a central office of the air-conditioning plant. The control may also be made available in a housing structurally separate from the drive. This may be expedient when existing drives are to be retrofitted with anemometer-assisted regulation.

Preferably, the electronic control is arranged on a printed circuit board (PCB) which lies partially inside and partially outside the housing of the drive. In this case, the sensor surface may be formed on that part of the circuit board which lies outside the drive housing (that is to say, is exposed to the flow). It is advantageous, but not necessary, that the electronic control for the drive and the measurement electronics for the thermal anemometer are on the same circuit board.

According to an especially preferred embodiment, the sensor element, in particular the sensor surface, is arranged in a recess of the housing of the drive or in an indentation or depression of its housing wall. The sensor element is in this case connected to an electronic circuit arranged inside the housing. The electronic circuit may also be accommodated in a structural unit which is separate from the drive housing. The separate structural unit may also be capable of being fastened to the outer wall of the drive housing via a clip, a plug or otherwise.

If a device according to the invention is arranged as a whole in the ventilation pipe, the drive preferably has a pivotable mounting for the ventilation flap. The ventilation flap is fastened exchangeably to said mounting, so that the device can be used for different cross sections of ventilation pipes, in that the suitable ventilation flap can be attached, depending on the cross-sectional size of the ventilation pipe. Fastening is preferably achieved by means of a snap or clamping mechanism, so that a fitter can exchange the flap without tools (for example, a screwdriver).

The ventilation flap mounting may also be connected fixedly to a ventilation flap. Exchangeability may sometimes also be, achieved in that the ventilation flap mounting is seated on the axis of rotation of the drive by means of a releasable screw fastening or clamping fastening.

According to an especially preferred embodiment, the sensor element is preceded by a turbulence generation element which is designed and spaced apart from the sensor surface in such a way as to generate in a directed manner, in the region of the sensor surface, an increased turbulent flow of the type which occurs, for example, downstream of a pipe curve in the ventilation pipe. If the flow were laminar without the turbulence generation element, it becomes turbulent as a result of this, and, if the flow is already turbulent, its degree of turbulence is increased or intensified in the region of the sensor surface.

Since turbulence (that is to say, a specific type of flow) is generated in a directed manner at the location of the sensor surface, defined measuring conditions prevail at the location of the sensor, and measurement becomes independent of whether the flow upstream of the sensor is, overall, laminar or turbulent or whether the degree of turbulence is relatively high or low. The turbulence generation element should generate a maximum turbulence which is higher than turbulence caused by a pipe bend or a duct fitting. The turbulence generation element should increase the turbulence (only) to the extent that the measured values achieve optimal accuracy under the various onflow conditions.

It was shown that, contrary to sensor arrangements previously known, the measurement results no longer depend on whether the line upstream of the measurement point is straight or curved. The planning of airconditiong systems is thereby simplified, and the air conditioning system is less susceptible to error or to faults.

Preferably, the turbulence generation element is a breakaway edge which runs transversely with respect to the flow direction and which precedes the sensor surface by at least 3 mm (for example, 1-2 cm) in the flow direction and is elevated with respect to the sensor surface by at least 0.5 mm (for example 1-2 mm). A flow zone with a high or increased degree of turbulence is formed downstream of the breakaway edge. By the suitable choice of the distances between the breakaway edge and sensor surface, a flow with high turbulence will always prevail at the measurement location.

The inventive arrangement of the breakaway edge differs from that according to DE 10 2005 038 598 essentially in the effect at the location of the sensor surface. In the arrangement according to DE 10 2005 038 598, the aim is to have as laminar a flow as possible at the location of the sensor surface and turbulence with the "dead water zone" is to take place completely upstream of the sensor surface.

Instead of a straight breakaway edge, other turbulence-generating elements such as, for example, structures projecting in a comb-like manner into the flow, may also be provided.

In addition to the turbulence element, a flow element, which widens in cross section in the flow direction, may be provided, following the sensor surface, while, starting from a height level of the sensor surface, a height is, reached which is greater than the height of the breakaway edge of the turbulence generation element with respect to the sensor surface. It was shown that, by means of such a flow element, the sensor characteristic can be improved at higher flow velocities.

The form of the following flow element corresponds in profile approximately to an ascending ramp. Preferably, it has no abrupt edges and corners, but, instead, has rounded transitions. If the sensor is integrated in a drive housing for a ventilation flap or the like, the end of the ramp may coincide with the outer wall of the housing, said outer wall running parallel to the flow direction.

The following flow element is, for example, at a distance from the sensor surface, which amounts to at least 3 mm (for example, 1-2 cm). The flow element therefore does not directly adjoin the sensor surface. For flow velocities in the field of ventilation technology (which typically lie in the range of 0.5-7 m/s) it has proved advantageous if the sensor surface is arranged approximately in the middle between the breakaway edge and flow element, as seen in the flow direction.

If the sensor is to be used only at relatively low flow velocities, the following flow element may be designed with a lower height and/or may be arranged further away from the sensor surface. It may occasionally also be dispensed with completely.

Preceding the sensor surface, a guide element is formed, to the rear end (that facing the sensor surface) of which the turbulence generation element (for example, the breakaway edge) is attached. A collecting surface for dirt particles, which is oriented transversely with respect to the flow direction, is provided at the front end (that facing away from the sensor surface) of the guide element. The guide element leads the flow to the breakaway edge and has an aerodynamic form with low flow resistance. So that the collecting surface works well, it typically has a width of more than 1 mm (for example, a few millimeters) transversely to the flow direction. Since that end of the guide element which points opposite to the flow direction is to have as low a flow resistance as possible, said end is rounded. That part of the surface, the surface normal of which is at an angle of more 135° to the main flow direction in the line pipe, is designated as the collecting surface.

The guide element serves for feeding the flow to the breakaway edge and prevents turbulences from occurring prematurely and in an uncontrolled way.

In order to determine the volume flow in the line pipe, the flow velocity at the center of the pipe cross section, specifically in the longitudinal direction of the line pipe, is pertinent. In order to reduce the sensitivity of the sensor element in other (undesirable) directions, the device may have at least one flow selection element laterally with respect to the sensor surface. The flow therefore runs through between the flow selection elements (placed laterally in the flow direction). Said flow selection elements may extend from the turbulence generation element as far as the following flow element.

The sensor element preferably has an SMD component containing a temperature sensor (for example, Pt-100 element) and a plate-shaped carrier for the SMD component. The carrier is, for example, an epoxy resin plate, such as is conventional as a carrier for electronic circuits. The sensor surface is formed by a copper layer. The SMD component is mounted in the region of the copper layer or in the immediate vicinity of the latter.

In such an embodiment, a guide element may even be dispensed with. If the plate-shaped carrier is oriented at a certain angle (of, for example, 2°-10°) obliquely to the flow direction (the surface normal then stands at an angle of 92°-100° to the flow direction), the breakaway edge can be formed directly by that edge of the carrier which faces the flow.

According to an especially preferred embodiment, the carrier is attached to the mounting in such a way that the flow meets the carrier on both sides. The latter also has a copper coating on both sides, the two copper layers being in good thermal contact with one another. The use of two sensor surfaces affords an advantageous (local) averaging of the measured value.

Temperature measurement may also take place by other technical means than by means of an SMD component (for example, by means of discrete circuit elements). It is also conceivable to combine the sensor surface and temperature measurement electronics in production terms so as to form an application-specific volume measurement instrument.

Preferably, if the plate-shaped carrier is used on both sides, the turbulence generation element and the following flow element are designed to be mirror-symmetrical in cross section with respect to a geometric mid-plane defined by the plate-shaped carrier.

It is also conceivable, however, that both sides of the carrier are used, but that the flow geometry is different. This could be expedient, for example, when the sensor is to be optimized in terms of different flow velocity ranges by means of the different flow geometries. Thus, for example, one side of the carrier could be especially sensitive to low to medium flow velocities, and the other side to medium to higher flow velocities. This then gives rise overall to a characteristic curve which is effective both in lower and in upper flow velocity ranges.

In an advantageous embodiment, the following flow element and the lateral flow selection elements are designed as a continuous, semicircle-like opening surface taking the form of a cone envelope. Pictorially speaking, the lateral flow selection elements and the following flow element form a surface, such as the margin a deep soup bowl. The sensor surface would then be the bottom of the imaginary soup bowl.

It is also possible, however, to configure the lateral flow selection elements separately from the following flow element. As a rule, the lateral flow elements are designed symmetrically with respect to the main flow direction (that is to say with respect to a longitudinal mid-plane, perpendicular to the sensor surface, of the device or of the ventilation pipe).

The guide element is advantageously drop-shaped in cross section in its region preceding the breakaway edge. In contrast to the drop shape, the profile of the guide element does not taper out downstream, but, instead, ends with the breakaway edge or breakaway edges.

The guide element may also be similar in cross section to an aircraft wing or have a lens-like form.

For practical use, it is advantageous if the device is an integrated unit composed of the ventilation flap, drive and regulation. The motor, gear and regulating circuit are in this case accommodated in a housing, on the outside of which the actuable ventilation flap and the sensor are provided. Said unit is mounted as a whole in the ventilation pipe (that is to say, in the flow region). The sensor is arranged on the housing in such a way that said sensor comes to lie approximately in the center of the ventilation pipe. The sensor element should be effectively decoupled thermally from the drive in the housing.

The fitter only needs to connect this one unit mechanically and electrically in order to bring about ventilation control at a specific location. Such a unit is compact and is cost-effective to install. No hoses have to be laid inside or outside the ventilation pipe, and no separate measuring rods have to be connected.

The situation is, of course, not ruled out where the sensor device is used independently of a drive in terms of its housing. It is perfectly conceivable to provide the sensor arrangement according to the invention in the form of a module, with which existing ventilation flap drives can be retrofitted.

In order to calibrate measurement with regard to the medium temperature, a temperature sensor is attached at another point on the housing. The temperature sensor may basically also be provided separately from the housing, although this has the disadvantage of a more complicated installation of the device as a whole.

The sensor element is advantageously fitted in a recess or indentation of the housing and connected to electronics arranged inside the housing. The recess is configured, for example, such that it frees a region of the printed board on which the electronic components of the drive control and flap regulation are set up. The sensor element and control may therefore advantageously be accommodated on a common board. At the same time, the following flow element and the lateral flow selection elements may be formed by the boundary walls of the recess.

It is possible, alternatively, to cause the printed board to project out of the otherwise parallepidedal housing, without an indentation being provided on the housing. The sensor element and the evaluation electronics may also be implemented separately from the drive housing.

A fastening arrangement may be attached to the housing, said arrangement making it possible to mount the housing in the ventilation pipe in such a way that the sensor element can be placed essentially in the center of the ventilation pipe. The ventilation flap, drive and regulation thus form a compact structural unit capable of being mounted inside the line pipe.

However, the drive may also be arranged outside the ventilation pipe. The measuring device is then mounted upstream of the ventilation flap in the line pipe.

Further sensors, which may be used for determining the air quality, may also be arranged on the housing according to the same structural principle. Mention may be made, for example, of moisture sensors or gas sensors which may likewise be placed on that part of the circuit board which projects out of the housing. If the composition of the outgoing air is measured by means of a gas sensor (for example a CO2 or VOC) a conclusion can be drawn as to the air quality in the room. If the air quality is poor, for example, the volume flow is increased, and if the air quality is good it is reduced.

Said further sensors may also be attached to a separate carrier or at a location, distant from the thermal anemometer, on the outside of the housing. Preferably, all the sensors are arranged on the same circuit board or at least are connected electronically to the same circuit board or its electronics. The further sensors may be arranged, protected against dirt, downstream of a guide element, in the same way as the hot-film air mass anemometer.

If a movement signaler is connected to the drive in order to detect the presence of persons in the ventilated room, the volume flow can be set correspondingly differently (for example higher).

Further advantageous embodiments and feature combinations of the invention may be gathered from the following detailed description and the whole of the patent claims.

BRIEF DESCRIPTION OF THE DRAWINGS

In the drawings used for explaining the exemplary embodiment:

FIG. 1 shows a diagrammatic perspective illustration of a structural unit with a ventilation flap, drive and volume flow sensor;

FIG. 2 shows an enlarged perspective illustration of the sensor element and of the flow-related components cooperating with said sensor element;

Identical parts are basically given the same reference symbols in the figures.

WAYS OF IMPLEMENTING THE INVENTION

Figure 3:
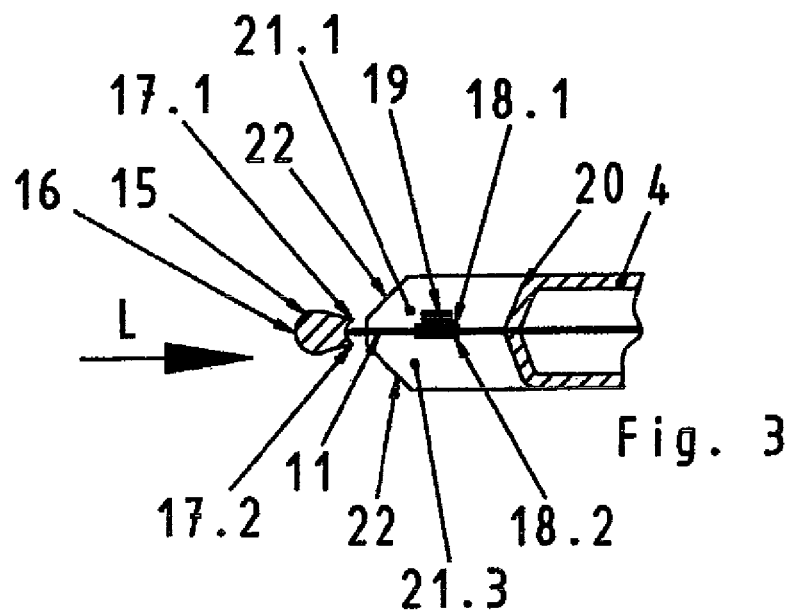
FIG. 3 shows an enlarged illustration of a cross section of the sensor arrangement.

FIG. 1 shows a circular ventilation pipe 1 with a longitudinal mid-axis 7. Inside the ventilation pipe 1 is attached an adjustable ventilation flap 2, by means of which the air stream can be throttled continuously in the flow direction L. The ventilation flap 2 is actuated by means of a motor 3, which is accommodated in a flat housing 4 and acts via a reduction gear 5 upon the axis of rotation 6 of the ventilation flap 2. The axis of rotation 6 is oriented perpendicularly to the longitudinal mid-axis 7. The mounting 23 for the ventilation flap 2 is fastened on the axis of rotation 6. The ventilation flap 2 is preferably of flexible design, as described, for example, in WO 2008/019519 (Belimo). Moreover, the ventilation flap 2 is fixed exchangeably to the mounting 23, so that suitable ventilation flaps 2 can be used, depending on the diameter of the ventilation pipe 1.

The approximately rectangular housing 4 is held at its corner 9.1 in the center of the ventilation pipe 1 by means of a mounting 8, which is attached to the inside of the ventilation pipe 1. The elongate housing 4 then extends from the position of the mounting 8 downstream approximately along the longitudinal mid-axis 7. The mounting 8 of the housing is designed here as a rod of specific length. In order that the same drive can be used for different cross sections of the ventilation pipe, the housing 4 is fastened to the mounting 8 via a simple screw connection. Depending on the pipe cross section, the housing 4 can be attached to a larger or smaller mounting 8, so that the housing 4 and, in particular, the sensor surface of the sensor element are always approximately in the center of the ventilation pipe 1.

The data connection to a central management system and the power supply take place via cabling which is fed through the mounting 8 from outside the ventilation pipe 1.

A recess 10 is provided at that end of the housing 4 which faces away from the ventilation flap 2, that is to say at that end of the housing 4 which is directed upstream. This recess 10 is approximately in the middle of the housing narrow side directed upstream (which extends essentially from the corner 9.1 to the corner 9.2) and lies on the longitudinal mid-axis 7 of the ventilation pipe 1 when the housing 4 is mounted correctly.

In the top view of the main side of the housing 4, the recess 10 is approximately semicircular with a short straight guide portion at the open end of the semicircle. The width of the short straight guide portion corresponds approximately to ½ to ⅓ of the width of the (approximately rectangular) housing 4.

The recess 10 frees a specific surface region of the circuit board 11, which is accommodated in the rear (that is to say upstream) part of the housing 4. The circuit board 11 has arranged on it an electronic circuit 12 for controlling the motor 3 or for setting the ventilation flap 2 according to the volume flow stipulated by a central management system. FIG. 2 depicts diagrammatically the lines from the electronic circuit 12 to the motor 3, to the external central management office, to the sensor element 13 of the volume flow sensor, that is to say to the SMD component 19, and to the temperature sensor 14.

FIG. 2 shows an enlarged detail of the upstream housing part with the flow-related elements according to the invention. A guide element 15 is provided, preceding (that is to say, upstream of) the recess 10. Said guide element extends essentially over the entire width of the recess 10. The guide element 15 has, upstream (that is to say on the side facing away from the housing 4), a collecting surface 16 of rounded profile for dirt particles. At the downstream end of the guide element 15, a breakaway edge 17.1 is formed. This is at a specific distance from the sensor element 13, which is formed by a copper surface 18.1 and an SMD component 19.

The distance is selected such that flow vortices arising downstream of the breakaway edge cover the copper surface 18.1.

The SMD component 19 is fixed on a copper surface 18.1 of the circuit board 11. The effective measurement area is thereby enlarged. On the one hand, susceptibility to faults is thus reduced, since punctiform soiling cannot cripple the sensor, and, on the other hand, a certain averaging of the temperature effect to be measured can be achieved.

The ramp-shaped boundary wall of the recess 10 forms the flow-related direction selection elements 21.1, 21.2 in the region of the straight guide portion of the recess. Thus, by means of the boundary wall which is lateral with respect to the sensor element 13, the effects of those flow components which do not run in the direction of the longitudinal mid-axis 7 upon the sensor element 13 are damped.

The ramp-shaped boundary wall of the recess 10 in the semicircular region downstream of the sensor element 13 constitutes a following flow element 20, which improves the characteristic curve of the volume flow sensor at higher flow velocities. Overall, the direction selection elements 21.1, 21.2 and the following flow element 20 form approximately a continuous curved surface opening with an increasing distance from the circuit board 11.

FIG. 3 shows the sensor arrangement in cross section. The relatively steep ramp of the following flow element 20 can be seen. The angle of inclination of the ramp preferably amounts to at least 45°, in particular to at least 60°, with respect to the circuit board 11. At that end of the circuit board 11 which lies opposite the ramp (that is to say, lies upstream), the guide element 15 is attached mirror-symmetrically to the plane of the circuit board 11. The flow element 20 extends to a greater height with respect to the sensor surface than the guide element 15, that is to say the flow element 20 is wider transversely to the flow direction than the guide element 15. The guide element is drop-shaped in cross section, at least with regard to that part of the profile which is directed upstream and has the collecting surface 16. The downstream part of the profile has two breakaway edges 17.1, 17.2 which are at a distance from one another which corresponds to the sum of the height of each breakaway edge above the surface of the circuit board 11 and of the thickness of the circuit board 11. There is no need for a special form between the breakaway edges 17.1, 17.2. It is important merely that the profile of the guide element 15 is designed such that the flow breaks away at the breakaway edges 17.1, 17.2. In the profile shown, the length of the guide element (as seen in the flow direction) is several millimeters. The width (perpendicularly to the surface of the circuit board 11) amounts, for example, to a few millimeters.

Further, the lateral flow selection elements 21.1 and 21.3 lying on opposite sides of the circuit board 11 can be seen in FIG. 3. These are likewise ramp-shaped, as seen transversely to the flow direction L. In the exemplary embodiment shown, the upstream narrow side 22 of the housing 4 is sloped and forms a ramp for the impinging flow.

The circuit board 11 is provided on both sides with a copper surface 18.1, 18.2, which is connected thermally to the SMD component 19. Flow-induced cooling can be determined on both sides of the circuit board or an average value is measured. This makes measurement additionally more robust with respect to faults.

The copper surfaces 18.1, 18.2 arranged on the opposite sides of the circuit board 11 do not need to be connected by means of copper contacts. If a sufficiently thin carrier plate made from suitable plastic is used, the heat passes through the circuit board 11. Since the copper surfaces 18.1, 18.2 are present on both sides of the printed board, measurement also takes place on both sides of the printed board. The precondition for this is that the sensor surfaces run essentially parallel to the flow direction (that is to say, the surface normal stands perpendicularly to the flow direction).

Figure 4:
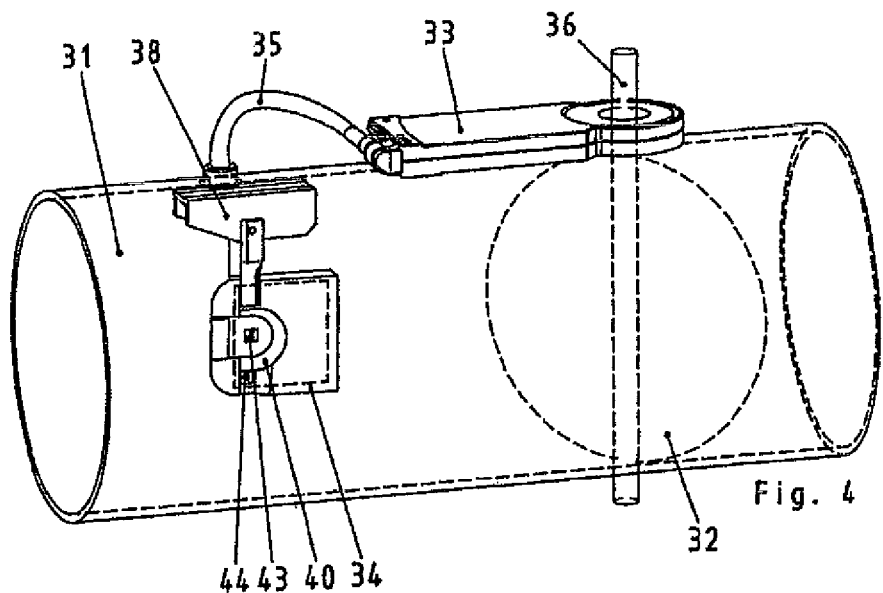
FIG. 4 shows a diagrammatic perspective illustration of a further embodiment in which the sensor element is structurally separate from the drive of the ventilation flap.

FIG. 4 shows a further embodiment of the invention. The ventilation pipe 31 has arranged in it the ventilation flap 32, the axis of the rotation 36 of which is led outward through the wall of the ventilation pipe 31. The drive 33 is coupled to the axis of rotation 36 in way known per se on the outside of the ventilation pipe 31. The housing 34 of the thermal anemometer is mounted in the ventilation pipe 31 separately from the drive 33. The mounting 38 of the housing 34 may be designed in the same way as explained in connection with FIG. 1. A cable 35 is provided for the electrical connection between the drive 33 and thermal anemometer. The recess 40 in the housing 34, the arrangement and design of the sensor element 43 and the temperature sensor 44 may be entirely similar to the embodiment described above (FIGS. 1-3).

The exemplary embodiments explained may be modified in many different respects. The drive does not need to be arranged exactly in the longitudinal direction in the ventilation duct. It may, for example, also run diagonally with respect to the flow direction.

The elongate drive housing lies, for example, slightly obliquely, for example at 10° to the duct longitudinal axis, and the anemometer is attached at the lower corner of the drive housing. This corner always lies at an angle of 10° in the middle of the duct. The advantage is better utilization of the space in the drive.

The mounting 8 may have fork-shaped carrier which surrounds the flat housing on both sides. Whereas, in FIG. 2, the mounting (or said carrier) holds the housing at an upstream (that is say, rear) corner, the fastening point, instead of being in said corner, may also be in the middle of the housing which is elongate (in the flow direction). The flow then first impinges onto the guide element 15, and brushes past the SMD component 19 and the flow element 20, before it arrives at the region in which the mounting (or the fork-shaped carrier) engages on the housing. The carrier can then surround the housing, without the flow being disturbed in the region of the SMD component 19. The fastening of the housing to the carrier takes place in the region (for example, in the middle) between the flow element 20 and the axis of rotation 6.

In order to provide an adjustable or settable connection between the mounting 8 and housing 4, for example, a fastening rail may be provided, which extends transversely with respect to the longitudinal direction of the housing (that is to say, in the radial direction with respect to the ventilation pipe) and to which the, for example, fork-shaped carrier can be fixed in different positions (for example, by screwing or clamping). By means of a housing mounting which can be set in this way, the position of the anemometer with respect to the cross section of the ventilation pipe can be adjusted. The same mounting can thus be used optimally for the ventilation pipes of different diameter.

The circuit board 11 may be provided with an orifice or perforation which is downstream with respect to the SMD component 19, that is to say between the SMD component 19 and the flow element 20. This may have the advantage that dirt cannot settle near the flow element 20 at the transition between the circuit board 11 and the housing wall which ascends in a ramp-like manner.

In general, the advantage of the thermal anemometer is that fewer signal transformations are necessary, which means fewer fault sources.

The Cu surfaces (the temperature of which is determined) may extend over a wide region of the duct cross section and can thus average the flow values. The length of a Cu surface may be, for example, half the pipe diameter. The width of the Cu surface amounts, for example, to 5 mm. However, the Cu surfaces may also be square. A large sensor surface has the advantage that local contamination of the sensor signal (for example, by lint) does not signify an appreciable disturbance of the measurement signal. Also, the fact that the air flows past laterally and does not impinge onto the sensor surface frontally reduces the risk of contamination, particularly also in conjunction with the preceding collecting surface on the guide element 15. It is possible, further, to provide the circuit board with nanolacquer and/or with an antistatic coating.

If the entire electronics for the sensors and control of the drive are arranged in a confined space on a circuit board, the construction of the device as a whole becomes more compact. It may, however, also be advantageous to use the volume flow sensor independently of the drive (for example, as a measurement and check station in a larger management system of a heating, ventilation and air-conditioning plant).

Instead of the breakaway edge being formed on a separate guide element 15, the circuit board on which the sensor surface is arranged may be skewed, for example at 4°, with respect to the flow direction (or to the longitudinal mid-axis of the ventilation duct). This may likewise generate strong vortices and achieve the desired effect.

Two or more thermal anemometers may also be provided on a drive or on a housing. In particular, a sensor according to the invention may be designed as a structural unit, which can be added as a module to a ventilation flap drive (for example, plugged, screwed or glued to the latter). A conventional drive can thus be converted into a volume-flow-regulated ventilation flap with the aid of the sensor module according to the invention. The drive and the ventilation flap may also be designed and installed, as explained in WO 2005/053975 (Belimo). In particular, it is therefore not absolutely necessary that the drive housing should extend in the longitudinal direction. An obliquely installed embodiment, as shown prior art, may also be envisaged.

The sensor module according to the invention may have a signal output, via which the temperature in the ventilation duct can be transferred to a central management system.

The most diverse possible applications May be envisaged. What is known as "energy monitoring" may be carried out, together with the measured volume flow, in that, for example, it is determined what volume enters the room, and at what temperature and how much leaves again via the suction-extracted outgoing air. Thus, for example, it can be detected whether a window is wide open. Within the scope of the invention, a system is combined with the drive. The temperature signal may also serve, in the event of a risk of frost, for sending a signal to the ventilation flap in order to close this. Thus, for example, the freezing-up of any heat exchanger can be prevented.

By means of the temperature signal, any backflow can be detected, for example due to a temperature jump (since cold outside air then flows in), while at the same time the flow velocity is low.

Further sensors (moisture sensors, gas sensors, etc.) may also be integrated in such an overall system. If the composition of the outgoing air is measured by means of a gas sensor (for example, a $CO_2$ or VOC), a conclusion as to the air quality in the room can be drawn. If the air quality is poor, for example, the volume flow is increased, and if the air quality is good it is reduced.

If a movement signaler is connected to the drive in order to detect the presence of persons in the ventilated room, the volume flow can be set correspondingly differently (for example, higher).

If the sensor is soiled over a large area, the thermal properties of the sensor will vary. If, then, the heating of the sensor is switched on/switched off according to a special test program, the warming-up and cooling-down time also varies correspondingly. These can then be compared with test values in the clean state. In the event of deviations, a maintenance message can be transmitted from the sensor or from the control of the drive.

When the flap is closed, a zero-point reset of the sensor can be carried out. In this regard, there may be provision for the ventilation flap to close automatically at certain time intervals, in order to determine the zero point.

A regulator may additionally be provided in the drive in order to control and regulate further drives according to the master/slave principle.

In summary, it is to be noted that, according to the invention, a flow body is installed upstream of the sensor surface of the thermal anemometer, so that the flow acquires maximum turbulence. The sensor signal thereby becomes independent of any pipe bends, duct fittings, etc.

The invention claimed is:

1. A device for measuring and regulating a volume flow in a ventilation pipe comprising
   a ventilation flap mountable in the ventilation pipe,
   a drive for actuating the ventilation flap, in order thereby to regulate the volume flow, and
   at least one sensor element, capable of being placed in the ventilation pipe by means of a mounting, for measuring the volume flow, wherein
   the sensor element is a thermal anemometer with a sensor surface, said thermal anemometer being arranged in a recess or in an indentation of an outside wall of a housing of the drive, said recess or indentation being semicircular with a straight guide portion at an open end of a semicircle and with a ramp-shaped boundary wall,
   said semicircle of said recess being located downstream of said sensor element, and
   said ramp-shaped boundary wall forming lateral flow elements in a region of the straight guide portion of the recess being arranged laterally with respect to the sensor element and being symmetrical with respect to a main flow direction.

2. The device according to claim 1, wherein the ramp-shaped boundary wall forms flow direction selection elements in the region of the straight guide portion, said direction selection elements being lateral with respect to the sensor surface in relation to a flow direction, in order to damp effects of flow components which do not run in a direction of a longitudinal mid-axis of the ventilation pipe.

3. The device according to claim 1, wherein the angle of inclination of the ramp-shaped boundary wall is at least 45° in relation to the sensor surface.

4. The device according to claim 1, wherein the angle of inclination of the ramp-shaped boundary wall is at least 60° in relation to the sensor surface.

5. The device according to claim 1, wherein a guide element is provided upstream of the recess, said guide element extending over the entire width of the recess.

6. The device according to claim 5, wherein the guide element has a collecting surface for dirt particles with a rounded profile on an upstream side.

7. The device according to claim 5, wherein the ramp-shaped boundary wall forms a following flow element in a region downstream of said sensor surface, said following flow element being wider transversely to the flow direction than said guide element.

8. The device according to claim 5, wherein the guide element is drop-shaped in cross section and comprises two breakaway edges at a downstream end, said breakaway edges being spaced from each other.

* * * * *

UNITED STATES PATENT AND TRADEMARK OFFICE
CERTIFICATE OF CORRECTION

PATENT NO. : 10,423,172 B2  
APPLICATION NO. : 12/921207  
DATED : September 24, 2019  
INVENTOR(S) : Urs Niederhauser et al.

Page 1 of 1

It is certified that error appears in the above-identified patent and that said Letters Patent is hereby corrected as shown below:

On the Title Page

Please amend item (75) Inventors as follows:  
"EGLI EGLI" to read --ALEXANDER ELGI--; and  
"PHILLIP HOLOCH" to read --PHILIP HOLOCH--.

Signed and Sealed this  
Seventh Day of January, 2020

Andrei Iancu  
*Director of the United States Patent and Trademark Office*